US012659924B2

(12) United States Patent
    Shrivastava et al.

(10) Patent No.: US 12,659,924 B2
(45) Date of Patent: Jun. 16, 2026

(54) AVOIDING PAGING COLLISION BY UE COMPRISING PLURALITY OF SIMS IN WIRELESS NETWORK

(71) Applicant: Samsung Electronics Co., Ltd., Gyeonggi-do (KR)

(72) Inventors: Vinay Kumar Shrivastava, Bangalore (IN); Fasil Abdul Latheef, Bangalore (IN); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 394 days.

(21) Appl. No.: 18/033,457

(22) PCT Filed: Oct. 22, 2021

(86) PCT No.: PCT/KR2021/014897
    § 371 (c)(1),
    (2) Date: Apr. 24, 2023

(87) PCT Pub. No.: WO2022/086264
    PCT Pub. Date: Apr. 28, 2022

(65) Prior Publication Data
    US 2023/0403678 A1     Dec. 14, 2023

(30) Foreign Application Priority Data

Oct. 22, 2020   (IN) ............................. 202041046154
Sep. 21, 2021   (IN) ............................. 202041046154

(51) Int. Cl.
    *H04W 68/02*        (2009.01)
    *H04W 68/12*        (2009.01)
    (Continued)

(52) U.S. Cl.
    CPC ........... *H04W 68/02* (2013.01); *H04W 68/12* (2013.01); *H04W 76/28* (2018.02); *H04W 88/06* (2013.01)

(58) Field of Classification Search
    None
    See application file for complete search history.

(56) References Cited

U.S. PATENT DOCUMENTS 10,165,473  B2   12/2018  Marwah et al.
2017/0127439  A1    5/2017  Gopal et al.
(Continued)

FOREIGN PATENT DOCUMENTS

TW          201743582        12/2017

OTHER PUBLICATIONS

PCT/ISA/210 Search Report issued on PCT/KR2021/014897, Jan. 26, 2022 pp. 3.
(Continued)

*Primary Examiner* — Frantz Bataille
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. Embodiments herein provide a method for avoiding paging collision by a UE comprising SIMs in a wireless network.

14 Claims, 5 Drawing Sheets

(51) Int. Cl.
_H04W 76/28_ (2018.01)
_H04W 88/06_ (2009.01)

(56) References Cited

U.S. PATENT DOCUMENTS

2017/0353893 A1 * 12/2017 Marwah ............ H04W 36/0058
2020/0128391 A1    4/2020 Yun et al.
2020/0196273 A1    6/2020 Ozturk et al.
2020/0329455 A1 * 10/2020 Ryu ...................... H04W 76/28

OTHER PUBLICATIONS

PCT/ISA/237 Written Opinion issued on PCT/KR2021/014897, Jan. 26, 2022 pp. 5.
Indian Examination Report dated May 26, 2022 issued in counterpart Application No. IN 202041046154, pp. 6.
Qualcomm Incorporated, apple, vivo, CATT, "Solution for paging collision avoidance", SA WG2 Meeting #136AH S2-2000116 Jan. 13-17, 2020, Incheon, Korea (was S2-1912399), pp. 8.

* cited by examiner

[Fig. 1]
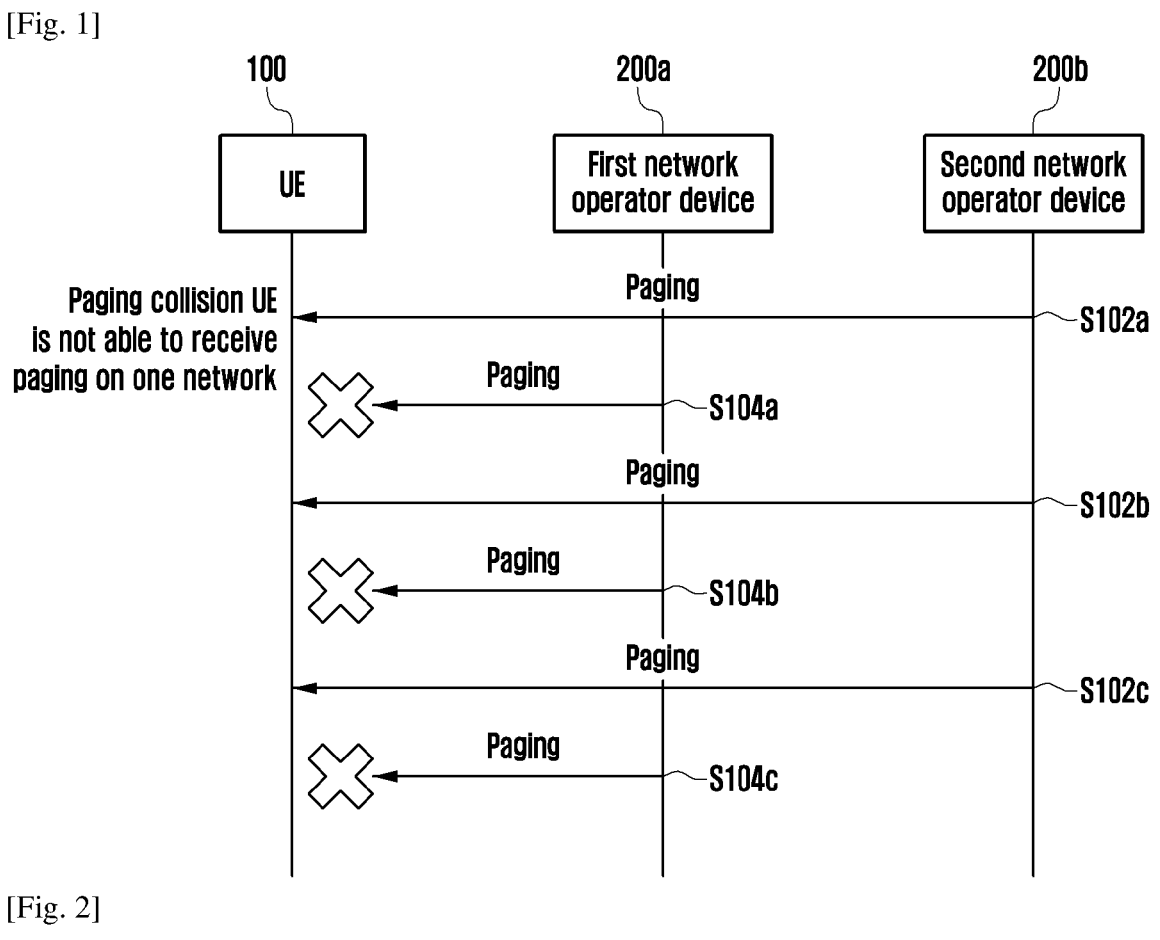
[Fig. 2]

[Fig. 3]
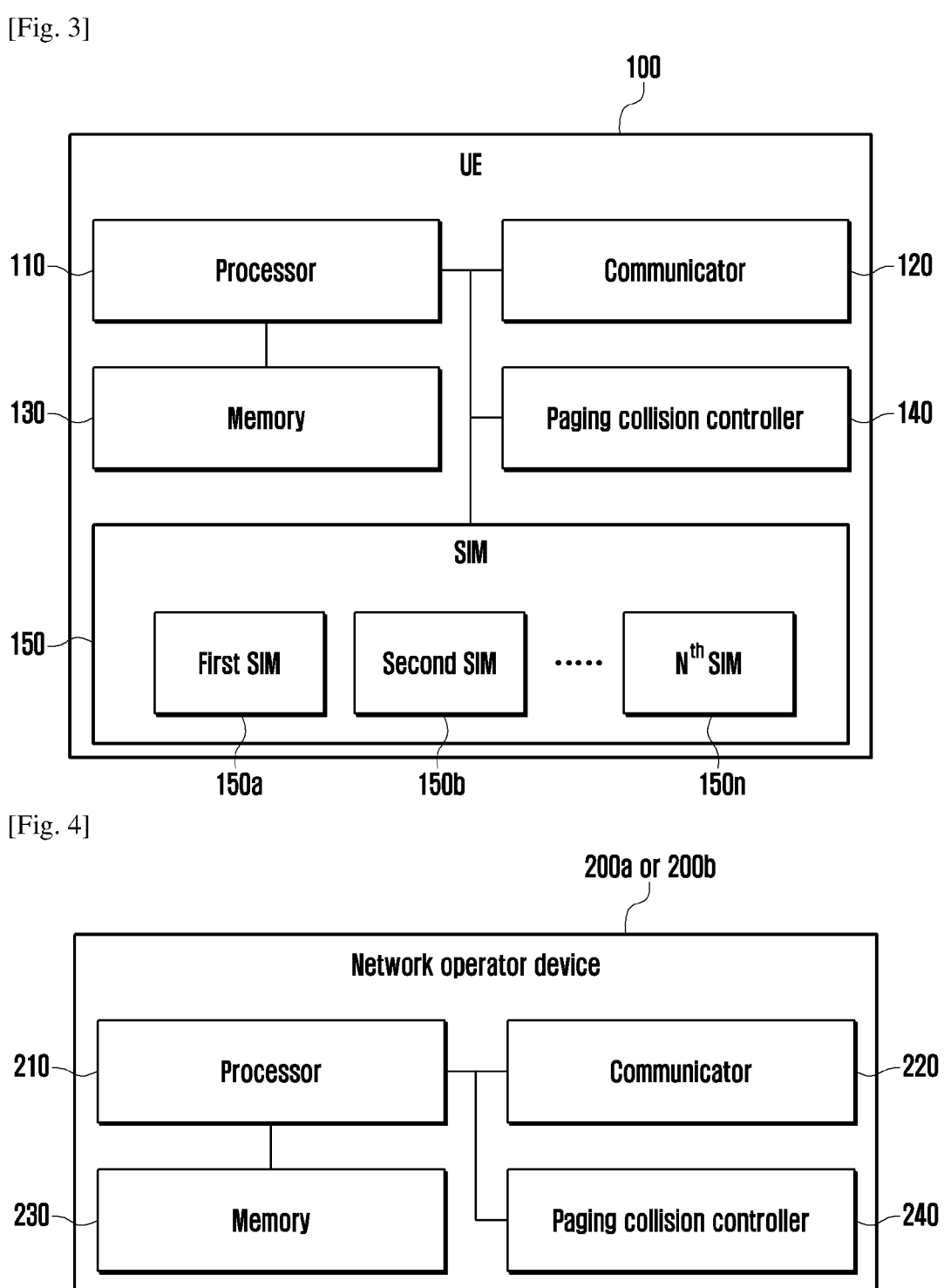
[Fig. 4]

[Fig. 5]
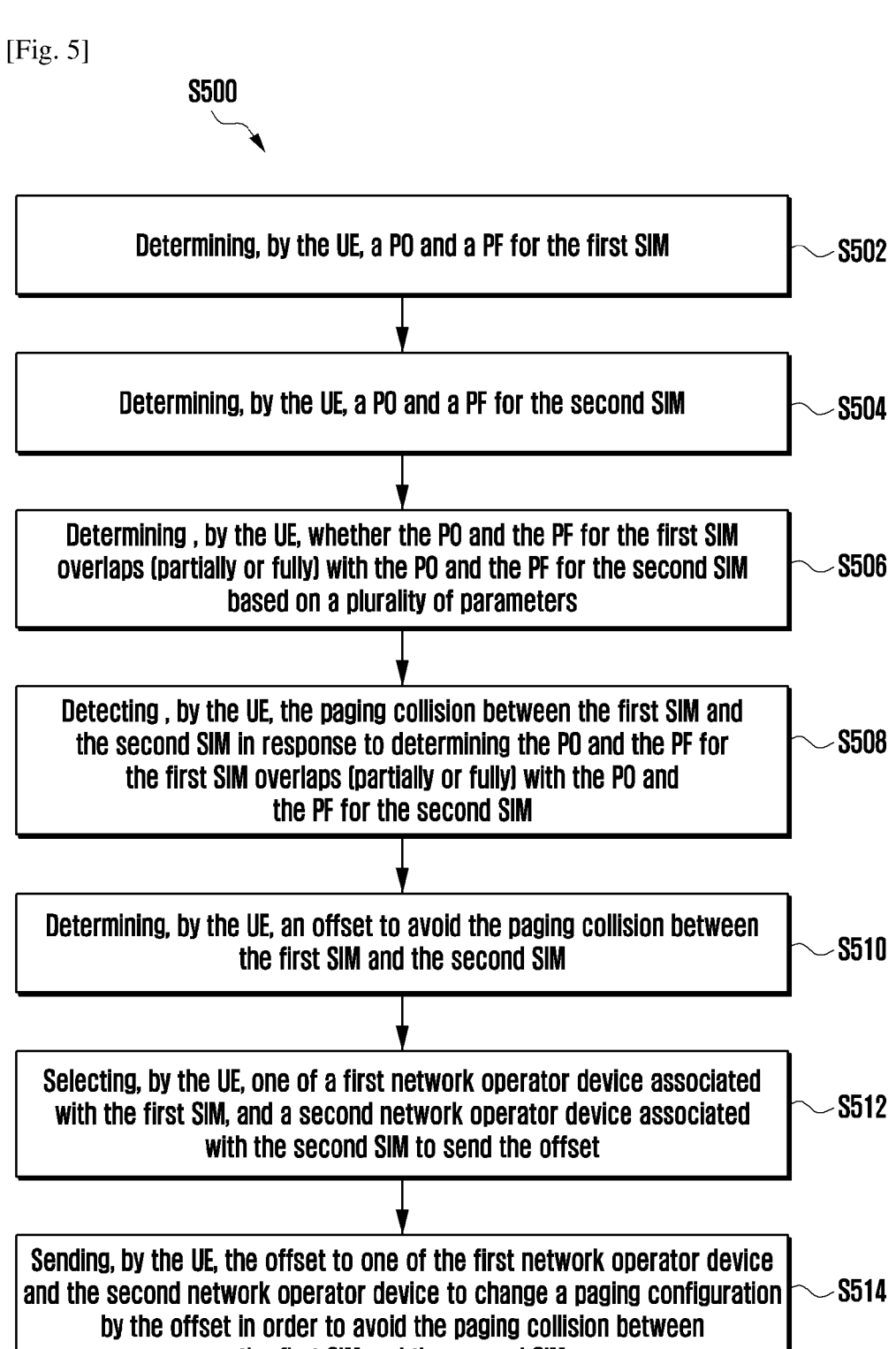

[Fig. 6]

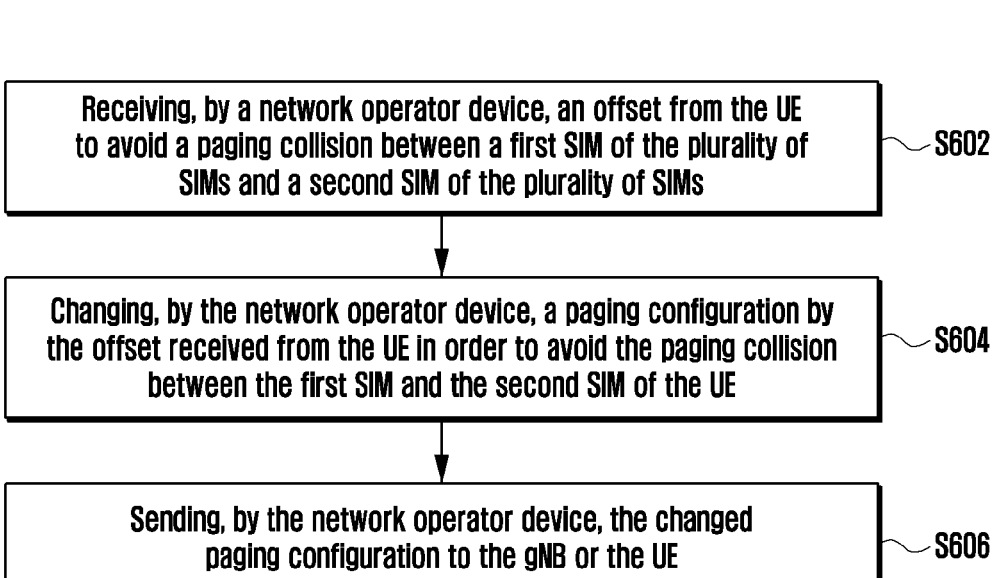

S600

| Receiving, by a network operator device, an offset from the UE to avoid a paging collision between a first SIM of the plurality of SIMs and a second SIM of the plurality of SIMs | S602 |

| Changing, by the network operator device, a paging configuration by the offset received from the UE in order to avoid the paging collision between the first SIM and the second SIM of the UE | S604 |

| Sending, by the network operator device, the changed paging configuration to the gNB or the UE | S606 |

[Fig. 7]
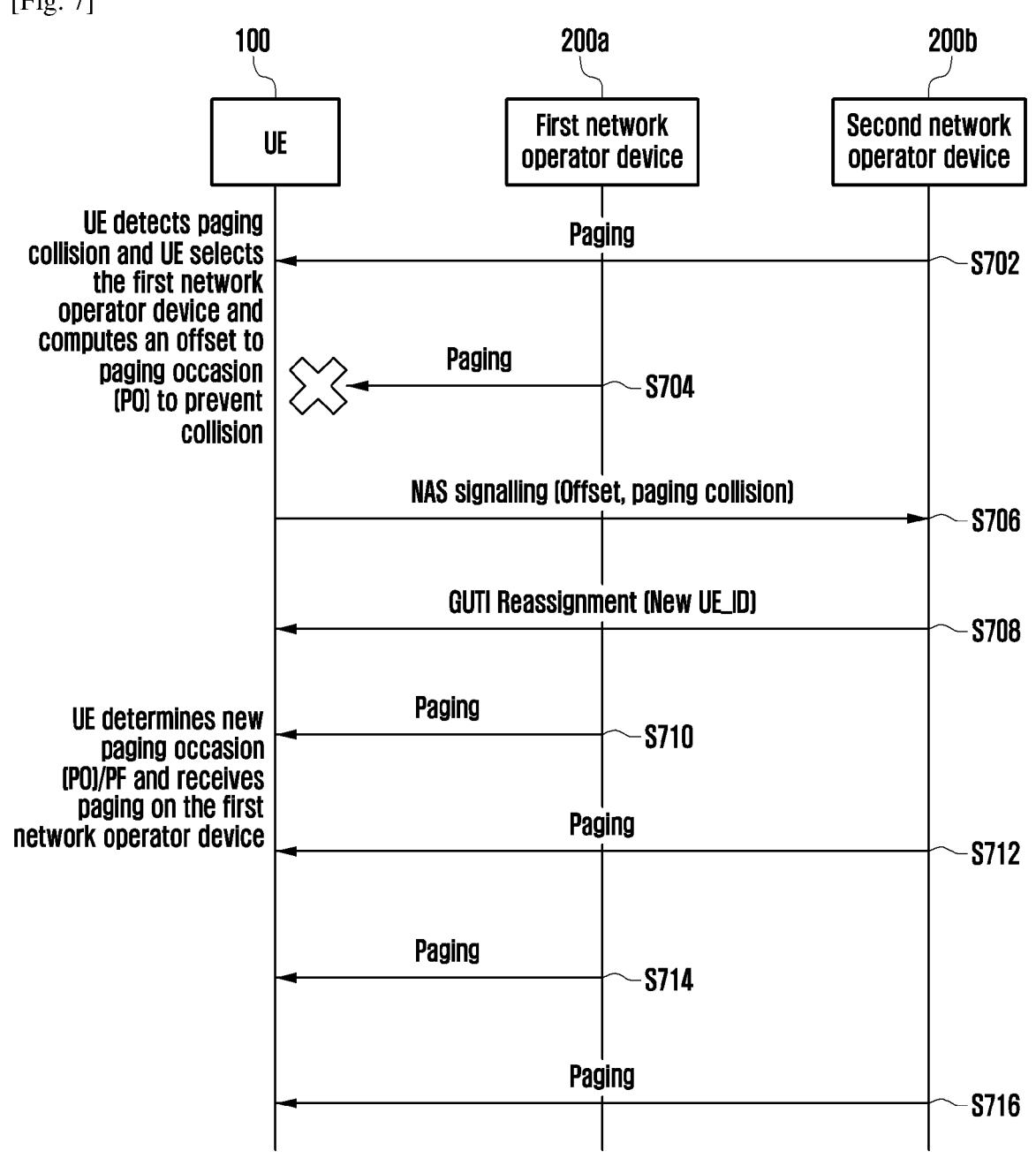

AVOIDING PAGING COLLISION BY UE COMPRISING PLURALITY OF SIMS IN WIRELESS NETWORK

PRIORITY

This application is a National Phase Entry of PCT International Application No. PCT/KR2021/014897, which was filed on Oct. 22, 2021, and claims priority to Indian Provisional Patent Application No. 202041046154 and Indian Patent Application number 202041046154, which were filed on Oct. 22, 2020 and Sep. 21, 2021, respectively, the entire content of each of which is incorporated herein by reference.

TECHNICAL FIELD

The present disclosure relates to a wireless network, and more specifically related to a method and a system for paging collision avoidance for a User Equipment (UE) including Multi-Subscriber Identity Module (SIMs) in the wireless network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network intrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In general, with technological advancement a user equipment (UE) is capable of accommodating Multi Subscriber Identity Modules (MSIM). Due to popularity of Multi-Subscriber Identity Module (MSIM) devices, the UE hosts more than one SIM to have the facility to connect to two or more different networks in order to avail different data plans, have user profiles like home and office, and provide increased connectivity and reliability with multiple connections etc. However, there is a potential issue related to paging collision on the multiple SIMs (on MUSIM UE) when their paging occasions overlap.

When the paging collision happens, there is a potential loss of a call reception on at least one of the networks and is drastic from user experience perspective as the user of the UE may miss out on important calls from the network where the loss of call reception occurs. In certain scenarios, the collision can as well be systematic i.e. page configuration parameters match such that every time it leads to collision and loss of paging at least to one of the network on each paging cycle.

Thus, it is desired to address the above mentioned disadvantages or other shortcomings or at least provide a useful alternative.

Solution to Problem

The principal object of the embodiments herein is to provide a method for paging collision avoidance for a UE including Multi SIMs in a wireless network (e.g., 5th generation (5G) network, $4^{th}$ generation (4G) network and combination of these networks or the like).

Another object of the embodiments herein is to provide a paging collision avoidance based on Globally Unique Temporary Identifier (GUTI) reassignment/Non Access Stratum (NAS) signalling.

Another object of the embodiments herein is to provide a paging collision avoidance based on an indicated offset to existing paging occasion (PO).

Another object of the embodiments herein is to provide a paging collision avoidance based on repetition from the network.

Another object of the embodiments herein is to provide a paging collision avoidance based on a UE assistance information.

Another object of the embodiments herein is to provide a paging collision avoidance with power efficient approach of PO placement.

Another object of the embodiments herein is to avoid the paging collision for the UE in the wireless network in an efficient manner.

Another object of the embodiments herein is to compute the paging offset values to align the paging monitoring occasion of different networks in an efficient manner.

Another object of the embodiments herein is to repeat the paging message in different PFs to increase the reliability of the UE and the networks.

Accordingly, the embodiment herein is to provide a method for avoiding paging collision by a UE comprising a plurality of SIMs in a wireless network. The method includes detecting, by the UE, a paging collision between the first SIM of the plurality of SIMs and a second SIM of the plurality of SIMs a priori, wherein the UE is in a RRC_IDLE state or a RRC_INACTIVE state with the first SIM and is in the RRC_IDLE state or the RRC_INACTIVE state with the second SIM of the plurality of SIMs. Further, the method includes determining, by the UE, an offset to avoid the paging collision between the first SIM and the second SIM. Further, the method includes selecting, by the UE, one of a first network operator device associated with the first SIM, and a second network operator device associated with the second SIM to send the offset. Further, the method includes sending, by the UE, at least one of potential paging collision indication and the offset to one of the first network operator device and the second network operator device to change a paging configuration by the offset in order to avoid the paging collision between the first SIM and the second SIM.

In an embodiment, detecting, by the UE, the paging collision between the first SIM and the second SIM includes determining a paging occasion (PO) and a paging frame (PF) for the first SIM, determining a PO and a PF for the second SIM, determining whether the PO and the PF for the first SIM partially or fully overlaps with the PO and the PF for the second SIM based on a plurality of parameters, and detecting the paging collision between the first SIM and the second SIM in response to determining the PO and the PF for the first SIM overlaps (partially overlaps or fully overlaps) with the PO and the PF for the second SIM.

In an embodiment, the plurality of parameters includes at least one of an UE identity, the PO, the PF, a location of a Physical Downlink Shared Channel (PDSCH) carrying paging information on the first SIM and the second SIM, a cross slot configuration i.e. gap between assignment on a Physical Downlink Control Channel (PDCCH) and the PDSCH (i.e., K0 parameter), a DRX (Discontinuous Reception) cycle length, a number of paging frames in a DRX cycle, a number of POs in the paging frame, a RAT and a DRX offset parameter.

In an embodiment, the one of the first network operator device and the second network operator device is selected based on at least one of a DRX cycle length for the first SIM and the second SIM, and a RAT (Radio Access Technology e.g. 4G, 5G) utilized on the first SIM and the second SIM.

In an embodiment, determining, by the UE, the offset to avoid the paging collision between the first SIM and the second SIM includes determining the time duration for the paging reception on the first SIM (150a) and the second SIM (150b) considering the paging configuration parameters that includes at least one of the UE ID, a PO, a PF, a paging DRX cycle, a number of paging frames in the DRX cycle, the number of POs in paging frame, the RAT and the cross-slot configuration (i.e., K0 Parameter), evaluating if there is a partial or full overlap between the time durations for the paging reception on the first SIM and the second SIM in an upcoming paging cycle, and determining potential paging collision if the evaluation results in to partial or full overlap for the relevant upcoming paging cycles.

In an embodiment, the offset is sent to one of the first network operator device and the second network operator device using one of a NAS (Non-Access Stratum) signalling message e.g. registration update, mobility update, tracking area update and a AS (access stratum) signalling message e.g. UE Assistance Information message. For example, the UE on 4G (EPS network) will utilize the tracking area update to send the offset information to the network.

Accordingly, the embodiment herein is to provide a method for avoiding paging collision at a UE comprising a plurality of SIMs in a wireless network. The method includes receiving, by a network operator device, an offset from the UE to avoid a paging collision between a first SIM of the plurality of SIMs and a second SIM of the plurality of SIMs. Further, the method includes changing, by the network operator device, a paging configuration by the offset received from the UE in order to avoid the paging collision between the first SIM and the second SIM of the UE. Further, the method includes sending, by the network operator device, the changed paging configuration to the UE. The network operator device can comprise of Core Network (CN) entities e.g. AMF (Access and Mobility Management Function in the 5GC) or MME (Mobility Management Entity in the EPS) and Radio Access Network (RAN) entities e.g. gNB or eNodeB. The changed or updated paging configuration can be provided by the AMF to the gNB and/or UE. When the UE is in the RRC_IDLE state, the paging is performed by the CN entities and it is called CN Paging. Whereas, the UE is in RRC_INACTIVE state, the paging is performed by the gNB and it is called RAN paging.

Accordingly, the embodiment herein is to provide a UE for avoiding a paging collision. The UE includes a memory including a plurality of SIMs, a processor, and a paging collision controller connected to the memory and the processor. The paging collision controller is configured to detect a paging collision between the first SIM of the plurality of SIMs and a second SIM of the plurality of SIMs a priori. The UE is in in a RRC_IDLE state or a RRC_INACTIVE state with the first SIM and is in RRC_IDLE state or a RRC_INACTIVE state with the second SIM of the plurality of SIMs. Further, the paging collision controller is configured to determine an offset to avoid the paging collision between the first SIM and the second SIM. Further, the paging collision controller is configured to select one of a first network operator device associated with the first SIM, and a second network operator device associated with the second SIM to send the offset. Further, the paging collision controller is configured to send the offset to one of the first network operator device and the second network operator device to change a paging configuration by the offset in order to avoid the paging collision between the first SIM and the second SIM.

Accordingly, the embodiment herein is to provide a network operator device for avoiding paging collision at a UE comprising a plurality of SIMs in a wireless network. The network operator device includes a memory, a processor, and a paging collision controller connected to the memory and the processor. The paging collision controller is configured to receive an offset from the UE to avoid a paging collision between a first SIM of the plurality of SIMs and a second SIM of the plurality of SIMs. Further, the paging collision controller is configured to change a paging configuration by the offset received from the UE in order to avoid the paging collision between the first SIM and the second SIM of the UE. Further, the paging collision controller is configured to send the changed paging configuration (i.e. updated UE_ID or offset) to the gNB and/or UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

Advantageous Effects of Invention

According to an embodiment of the disclosure, a method for paging collision avoidance for a UE including Multi SIMs is provided.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1 is an example sequence flow diagram illustrating step by step operations for a paging collision scenario in a wireless network, according to an embodiment as disclosed herein.

FIG. 2 is an overview of a wireless network for avoiding paging collision by a UE comprising a plurality of SIMs, according to an embodiment as disclosed herein;

FIG. 3 shows various hardware components of the UE, according to an embodiment as disclosed herein;

FIG. 4 shows various hardware components of a network operator device, according to an embodiment as disclosed herein;

FIG. 5 is a flow chart illustrating a method, implemented by the UE, for avoiding the paging collision in the wireless network, according to an embodiment as disclosed herein;

FIG. 6 is a flow chart illustrating a method, implemented by the network operator device, for avoiding the paging collision in the wireless network, according to an embodiment as disclosed herein; and FIG. 7 is an example sequence flow diagram illustrating step by step operations for avoiding the paging collision in the wireless network, according to an embodiment as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for avoiding paging collision by a UE comprising a plurality of SIMs in a wireless network. The method includes detecting, by the UE, a paging collision between the first SIM of the plurality of SIMs and a second SIM of the plurality of SIMs a priori, wherein the UE is in RRC_IDLE state or RRC_INACTIVE state with the first SIM and is in RRC_IDLE state or RRC_INACTIVE state with the second SIM of the plurality of SIMs. Further, the method includes determining, by the UE, an offset to avoid the paging collision between the first SIM and the second SIM. Further, the method includes selecting, by the UE, one of a first network operator device associated with the first SIM, and a second network operator device associated with the second SIM to send the offset. Further, the method includes sending, by the UE, at least one of potential paging collision indication and the offset to one of the first network operator device and the second network operator device to change a paging configuration by the offset in order to avoid the paging collision between the first SIM and the second SIM.

The proposed method can be used to avoid the paging collision for multi-SIM UEs in the wireless network in an efficient manner and the method can be used to compute the paging offset values to align the paging monitoring occasion of different networks in an efficient manner e.g. increased power saving with aligning the POs on the two networks close by so that the UE can be awake on one network followed by another network for paging reception. Thus, the UE avoids awaking twice due to the POs placed at different time occasions and consuming more power.

The proposed method can be used to repeat the paging message in different PFs to increase the reliability of the UE and the networks.

Referring now to the drawings and more particularly to FIGS. 1 through 7, where similar reference characters denote corresponding features consistently throughout the figures, there are shown preferred embodiments.

FIG. 1 is an example sequence flow diagram illustrating step by step operations for a paging collision scenario in a wireless network, according to an embodiment as disclosed herein.

Referring to FIG. 1, at S102*a*, a second network operator device (200*b*) sends the paging to the UE (100). At S104*a*, a first network operator device (200*a*) sends the paging to the UE (100). The UE (100) determines the paging collision and the UE (100) is not able to receive paging from the first network operator device (200*a*). Similarly, at S102*b* and S102*c*, the second network operator device (200*b*) sends the paging to the UE (100). At S104*b* and 104*c*, the first network operator device (200*a*) sends the paging to the UE (100). The UE (100) determines the paging collision and the UE (100) is not able to receive paging the first network operator device (200*a*).

FIG. 2 is an overview of a wireless network (1000) for avoiding paging collision by a UE (100) comprising a plurality of SIMs (150) (as shown in the FIG. 3), according to an embodiment as disclosed herein.

In an embodiment, the wireless network (1000) includes the UE (100), a first network operator device (200*a*) and a second network operator device (200*b*). The first network operator device (200*a*) can be, for example, but not limited to a 5G network operator device and a 4G network operator device. The second network operator device (200*b*) can be, for example, but not limited to a 5G network operator device and a 4G network operator device. The UE (100) is communicated with the first network operator device (200*a*) and the second network operator device (200*b*) through a wireless communication medium or a wired communication medium. The UE (100) can be, for example, but not limited to a smart phone, a smart watch, a foldable device, an internet of things (IoT) device, an immersive device, a Television with communication facility, a connected car and a virtual reality device. The wireless network (1000) can be, for example, but not limited to a 4G wireless network, a 5G wireless network and a 6G wireless network.

The UE (100) is configured to detect a paging collision between a first SIM (150*a*) (as shown in the FIG. 3) of the plurality of SIMs (150) and a second SIM (150*b*) of the plurality of SIMs (150) a priori. The UE (100) is in a RRC_IDLE state or a RRC_INACTIVE state with the first SIM (150*a*) and is in the RRC_IDLE state or a RRC_INAC-TIVE state with the second SIM (150*b*) of the plurality of SIMs (150). In an embodiment, the UE (100) is configured to determine a PO and a PF for the first SIM (150*a*) and determine a PO and a PF for the second SIM (150*b*). Further, the UE (100) is configured to determine whether the PO and the PF for the first SIM (150*a*) overlaps (i.e., partially overlaps or fully overlaps) with the PO and the PF for the second SIM (150*b*) based on a plurality of parameters. The plurality of parameters can be, for example, but not limited to, an UE identity, a PO, a PF, location of a PDSCH carrying paging information on the first SIM (150*a*) and the second SIM (150*b*), cross slot configuration (i.e., K0 parameter), a DRX cycle length, and a DRX offset parameter. After determining the PO and the PF for the first SIM (150*a*) overlaps (i.e., partially overlaps or fully overlaps) with the PO and the PF for the second SIM (150*b*), the UE (100) is configured to detect the (potential) paging collision between the first SIM (150*a*) and the second SIM (150*b*).

Further, the UE (100) is configured to determine an offset to avoid the paging collision between the first SIM (150*a*) and the second SIM (150*b*). The offset to avoid the paging collision between the first SIM and the second SIM is determined by determining the time duration for the paging reception on the first SIM (150*a*) and the second SIM (150*b*) considering the paging configuration parameters that includes the UE ID, the PO, the PF, the paging DRX cycle, the number of paging frames in the DRX cycle, the number of POs in the paging frame, the RAT and the cross-slot configuration (i.e., K0 Parameter), evaluating if there is a partial or full overlap between the time durations for the paging reception on the first SIM (150*a*) and the second SIM (150*b*) in an upcoming paging cycle, and determining poten-tial paging collision if the evaluation results in to partial or full overlap for the relevant upcoming paging cycles. Fur-ther, the UE (100) is configured to select the first network operator device (200*a*) associated with the first SIM (150*a*) or the second network operator device (200*b*) associated with the second SIM (150*b*) to send the offset. The first network operator device (200*a*) or the second network operator device (200*b*) is selected based on at least one of a DRX cycle length for the first SIM (150*a*) and the second SIM (150*b*), and a RAT utilized on the first SIM (150*a*) and the second SIM (150*b*) or random selection or a round-robin selection approach or based on some event like reselection happened on the first SIM (150*a*) and the second SIM (150*b*).

Further, the UE (100) is configured to send the potential paging collision indication offset to the first network opera-tor device (200*a*) or the second network operator device (200*b*) to change a paging configuration by the offset in order to avoid the paging collision between the first SIM (150*a*) and the second SIM (150*b*). The offset is sent to one of the first network operator device (200*a*) and the second network operator device (200*b*) using a NAS signalling message e.g. Registration update, Mobility update, Tracking Area update and a AS signalling message e.g. UE Assistance Information message.

Further, the first network operator device (200*a*) or the second network operator device (200*b*) is configured to receive the offset from the UE (100) to avoid the paging collision between the first SIM (150*a*) and the second SIM (150*b*). After receiving the offset from the UE (100) to avoid the paging collision between the first SIM (150*a*) and the second SIM (150*b*), the first network operator device (200*a*) or the second network operator device (200*b*) is configured to change a paging configuration by the offset received from the UE (100) in order to avoid the paging collision between the first SIM (150*a*) and the second SIM (150*b*). Further, the first network operator device (200*a*) or the second network operator device (200*b*) is configured to send the changed paging configuration (i.e. updated UE_ID or offset) to the gNB and/or UE (100). The first network operator device (200*a*) or the second network operator device (200*b*) can comprise of Core Network (CN) entities e.g. Access and Mobility Management Function in the 5GC) or the MME (Mobility Management Entity in the EPS) and Radio Access Network (RAN) entities e.g. gNB or eNodeB. The changed or updated paging configuration can be provided by the AMF entity to the gNB and/or UE (100). When the UE (100) is in the RRC_IDLE state, the paging is performed by the CN entities and it is called a CN Paging. Whereas, the UE is in the RRC_INACTIVE state, the paging is performed by the gNB and it is called RAN paging.

In the wireless network (1000), the proposed method describes the methods considering two SIMs for the illus-tration purpose. However, this does not limit the methods and description for multiple SIM cases e.g. where more than two SIMs are supported like 3 SIMs, 4 SIMs, 5 SIMs and so on in the same UE (100). Further the two SIMs are considered in analysis are in RRC_IDLE or RRC_INACTIVE in the example description. However, the methods and approaches can be extended to other modes/states and combinations thereof. Also, Radio Access Technology of the SIMs (150) can also pertain to others RATs than 5G like 2G, 3G, 4G, 6G, a Wireless Fidelity (Wi-Fi) and so on and possible combinations thereof.

A New Radio or 5G UE (NR UE) in the RRC_IDLE or RRC_INACTIVE state calculates its PO and PF based on its UE ID and N, where the UE ID: 5G-S-TMSI mod 1024, and N: number of total paging frames in DRX cycle T of UE. Based on the PO and PF, the UE (100) monitors the PDCCH (Physical Downlink Control Channel) to read paging DCI i.e. Downlink Control Information (DCI format 1_0 with CRC scrambled by P-RNTI i.e. Paging Radio Network Terminal Identifier) and further reads the paging message. The UE (100) decides if the paging message is intended for it only after reading the actual paging message. All other UEs (100) discard the paging message as a False Alarm. This way, a group of UEs (paging group) reads PDCCH and further paging message based on respective UE_ID and N on the same PO and PF. The PF and PO for paging are determined by the following formulae:

The SFN for the PF is determined by:

$$(SFN + PF\_offset) \bmod T = (T \text{ div } N) * (UE\_ID \bmod N)$$

Index (is), indicating the index of the PO is determined by:

$$i\_s = \text{floor}(UE\_ID/N) \bmod Ns$$

In an embodiment, the following parameters are used for the calculation of PF and i_s above:

T: DRX cycle of the UE (100),
N: number of total paging frames in T,
Ns: number of paging occasions for a PF,
PF_offset: offset used for PF determination, and
UE_ID: 5G-S-TMSI mod 1024

In case when the SIM belongs to LTE UE_ID: IMSI mod 1024

LTE/EPS Case:

UE_ID is IMSI mod 1024 for LTE/EPS, that is, when offset (i.e. IMSI offset) is provided by the NAS layer to the AS layer in UE (100)

$$(SFN + PF\_offset) \bmod T = (T \text{ div } N) * ((IMSI + IMSI \text{ offset}) \bmod N)$$

$$i\_s = \text{floor}((IMSI + IMSI \text{ offset})/N) \bmod Ns$$

or when updated IMSI is provided by NAS layer to AS layer in the UE (100)

$$(SFN + PF\_offset) \bmod T = (T \text{ div } N) * ((\text{updated IMSI}) \bmod N)$$

$$i\_s = \text{floor}((\text{updated IMSI})/N) \bmod Ns$$

5G/5GC Case:

The SFN for the PF is determined by:

$$(SFN + PF\_offset) \bmod T = (T \text{ div } N) * (UE\_ID \bmod N)$$

Index (is), indicating the index of the PO is determined by:

$$i\_s = \text{floor}(UE\_ID/N) \bmod Ns$$

where UE_ID is 5G-S-TMSI mod 1024 for 5G/5GCS when offset is provided by the NAS layer to the AS layer in the UE (100)

$$(SFN + PF\_offset) \bmod T = (T \text{ div } N) * ((5G\text{-}S\text{-}TMSI + \text{offset}) \bmod N)$$

$$i\_s = \text{floor}((5G\text{-}S\text{-}TMSI + \text{offset})/N) \bmod Ns$$

or when updated UE_ID (i.e. updated 5G-S-TMSI) is provided by the NAS layer to the AS layer in the UE (100) i.e. a new UE_ID is assigned in the GUTI reallocation $$(SFN + PF\_offset) \bmod T = (T \text{ div } N) * ((\text{updated } 5G\text{-}S\text{-}TMSI) \bmod N)$$

$$i\_s = \text{floor}((\text{updated } 5G\text{-}S\text{-}TMSI)/N) \bmod Ns$$

International Mobile Subscriber Identity (IMSI) is a permanent UE identity whereas 5G-S-TMSI is a temporary identity which can be reassigned by a core network to the UE (100) frequently e.g. possibly at every cell reselection a new 5G-S-Temporary Mobile Subscriber Identity (TMSI) could be reassigned.

In one of the embodiment, the UE (100) performs a paging collision detection mechanism for the two SIMs (150). It involves both (a) paging collision detection when actual collision has already occurred and (b) potential paging collision which may occur and the UE (100) determines in advance. Two SIMs (150) considered may belong to 4G Long Term Evolution (LTE) or 5G New Radio (NR) network e.g. there may be combination like NR+NR, NR+LTE, LTE+NR and LTE+LTE for the two SIMs (150) used by the UE (100). When there is reselection or the NAS procedure or other reasons which leads to reassignment of new 5G-S-TMSI for the first SIM (150a) and/or second SIM (150b):

A. The UE (100) computes the PF and PO with the newly assigned 5G-S-TMSI,
B. The UE (100) compares the computed PF and PO occasions for first SIM (150a) for the computed PF and PO for the second SIM (150b),
I. While evaluating the overlap (partial or full) for PF and PO for two SIMs (150), the UE (100) also considers the location of the PDSCH carrying paging information on both the SIMs (150).
II. The UE (100) considers the cross slot configuration i.e. K0 parameter for each of the SIMs (150). The PDSCH location is related K0 parameter, which determines the gap between PDCCH and PDSCH.
a. If K0=0, the UE (100) considers PDCCH and PDSCH are in the same slot and ignores PDSCH for paging collision determination,
b. If K0>0, the UE (100) considers there is cross-slot operation for paging, the PDCCH and the PDSCH are not in same slot and adds K0 to the duration while evaluating paging collision possibility. In certain cases, the PDSCH location may extend beyond the PF used for paging as well.
III. While evaluating the overlap for PF and PO for two SIMs (150), the UE (100) also considers the DRX cycle length and DRX offset parameters
a. When there is asymmetric DRX configurations on two SIMs (150) i.e. DRX cycle lengths and/or DRX offsets are not matching i.e. the UE (100) evaluates the overlapping duration by considering the DRX cycle lengths and/or DRX offsets; otherwise in case of symmetric DRX configuration i.e. both SIMs have same DRX cycle lengths and DRX offset, the UE (100) ignores these parameters in evaluation of paging collision determination.

In one embodiment, the UE (100) computes the offset value to the existing UE_ID that is suitable to resolve the (potential) paging collision by avoiding the overlap of PF/PO of the first SIM (150*a*) with that of the second SIM (150*b*). There may also be uneven distribution for PF/PO among UEs when random offset or alternate UE_ID values are chosen by UEs. The UE implementations may differ in actual gap time requirements for paging reception across different USIMs and thereby, offset values needed. Further there may be case for more than two Universal Mobile Telecommunications System Subscriber Identity Module (USIMs) supported by the UE (100).

Considering there can be different paging configuration parameters for SIM A (UE_ID, T, N, PF-offset) and SIM B (UE_ID', T', N', PF_offset'), and the UE (100) can choose to provide offset to one of the two network operator device (200*a* or 200*b*). A suitable offset value (on lower side) considering different range of PF/PO overlap between two network operator device (200*a* or 200*b*) can be given as—

$$1+\text{Ceil}((T \text{ div } N')/(T \text{ div } N)) => \text{If reporting offset } on\ NW\ A;\ \text{or}$$

$$1+\text{Ceil}((T \text{ div } N)/(T \text{ div } N')) => \text{If reporting offset } on\ NW\ B$$

At a time, the UE (100) is required to provide offset to only one of the two networks (200*a* and 200*b*). With offset value, the UE (100) is able to address asymmetric paging configurations on the two SIMs (150). In this scenario there may be adjoining, partial or complete overlapping possibilities for PF/PO for the two SIMs (150). By placing paging occasions closely but still not overlapping with the proposed offset computation approach, method also achieves power efficient solution. As the UE (100) is required to be awake on both the network operator device (200*a* or 200*b*) in adjacent time durations and can undertake sleep on both the networks, there is substantial power saving achieved. Moreover, there is no randomness which is introduced by multitude of UEs selecting any arbitrary offset value.

In another embodiment, as the paging timings and paging configuration are aware to the access stratum (lower layers) in the UE protocol stack, the method can be used to propose that access stratum handles the computation of the offset value. The method proposes following at least one of the approaches for ensuring an efficient and reliable implementation of the paging avoidance by offset computation:

A. The UE (100) computes suitable offset value considering different paging configurations on two networks operator device (200*a* or 200*b*), and the UE (100) indicates to "only" one of the "selected" network operator device (200*a* or 200*b*) at a time. The network operator device (200*a* or 200*b*) applies the provided offset value. The UE (100) may select one of the network operator device (200*a* or 200*b*) on basis of some criteria like DRX cycle length, RAT utilized on the SIM/Network, random selection or round-robin selection approach or based on some event like reselection happened on the SIM etc.

B. A clear specification for the UE (100) is provided for offset computation, as it is necessary to achieve effective and deterministic behavior. Either I. A rule or guideline is specified that mentions the UE (100) selects the lowest possible offset value that resolves the paging collision, or II. Exact formulation like proposed above for offset computation is adopted.

The Access stratum layer computes offset value upon request from upper layer and provides offset value to upper layer for delivering to the network operator device (200*a* or 200*b*).

In another embodiment, the UE (100) provides a fixed and specific value of offset to the network operator device (200*a* or 200*b*). The specific value of offset can be a number N which can be 1 or 2 or 3 or 4 or so on. The specific value of offset depends on the UE determination in terms of symmetric or asymmetric configuration for the DRX cycles or PF_offset and/or cell timings offsets and/or UE implementation/capability limitation factor etc.

Once the offset value is computed by the access stratum, there could be two possible approaches to signal or share this information to the network viz. through NAS (Non-Access Stratum) signaling or through AS signaling. Consider both the solutions as—

1. NAS based solution: UE_ID is updated with offset by a Core Network Entity (e.g. AMF (Access Mobility Function) entity or MME).

a. A UE AS provides the computed offset value to the NAS layer.

b. The NAS layer triggers the NAS procedure to initiate NAS signaling and passes the computed offset value as assistance information to the AMF entity. The NAS procedure used could be Mobility registration, registration request, registration update, GUTI reassignment request etc. Until confirmation message or L2 ACK for the successful message transmission is not received, the UE (100) continues with previous UE_ID value for paging reception (i.e. not considering offset). Confirmation message e.g. registration accept carries the offset value or updated UE_ID from the network operator device (200*a* or 200*b*). In an example, the network operator device (200*a* or 200*b*) may possibly also choose an updated UE_ID by utilizing offset value as updated UE_ID=(5G-S-TMSI+offset+N) mod 1024. Here adding N also gives same paging timing but a different UE_ID. In an alternative approach, N may be absent or N is 0.

c. The NAS signaling trigger initiates establishment of RRC connection and the UE (100) transits to the RRC_CONNECTED state from the RRC_IDLE or RRC_INACTIVE state.

d. The AMF entity receives the offset from the UE (100) and updates UE_ID based on the offset. The AMF (or MME) entity provides the updated UE_ID or offset to the gNB (or eNodeB) and/or UE (100). In the UE (100), the NAS layer receives the offset and computes the updated UE_ID (IMSI+offset and/or 5G-S-TMSI+offset) to use for paging reception and provides same to the AS layer in the UE (100) to compute PO/PF for paging reception. Alternatively, the NAS layer receives the offset and provides the same to the AS layer and the AS layer computes the PO/PF utilizing the offset information along with existing UE_ID (IMSI and/or 5G-S-TMSI).

e. The AMF entity triggers paging request to RAN (Radio Access Network) with updated UE_ID for RRC_IDLE state UE, every paging message carries updated UE_ID.

f. The AMF entity sends updated UE_ID or offset in the CN assistance information to the RAN for RRC_INACTIVE state UE.

g. The RAN provides CN paging to the UE (100) with calculating PF/PO with updated UE_ID for the RRC_IDLE state UE.

h. The RAN provides RAN paging to the RRC_INACTIVE state UE (100) with the PF/PO with updated UE_ID or offset as received in CN assistance information from CN.

i. The UE (100) decodes paging with updating UE_ID (S-TMSI+Offset) at PF/PO computed with updated UE_ID.

j. The UE (100) attempts to receive paging at PF/PO which is derived from updating UE_ID with computed offset.

2. AS based solution: PF/PO timing is computed by the RAN with applying offset to UE_ID. RAN receives the offset from the UE (100) and confirms the same to UE (100):

a. The UE AS computes the offset value and triggers an AS signaling. AS signaling can be RRC signaling wherein UE assistance information message is carried or MAC signaling wherein MAC CE (Medium Access Control Layer Control Element) is utilized. Offset value is therefore carried by UE assistance information or MAC CE.

b. The AS signaling trigger initiates establishment of RRC connection and the UE (100) transits to the RRC_CONNECTED state from the RRC_IDLE or the RRC_I-NACTIVE state. This involves doing a RACH (Random Access Channel) mechanism and setting up SRB (signaling bearer).

c. The offset value provided in the UE assistance information or MAC CE is received by the RAN.

d. The RAN stores the offset value in the UE context in RRC_INACTIVE state.

e. Further, the RAN maintains the UE context along with offset value even when the UE transits to the RRC_IDLE state. For this, it allocates a storage to hold the information.

f. The RAN receives paging request from the AMF entity for the UE (100) and applies the "offset" while computing PF/PO (for RRC_IDLE state UE case and also RRC_INACTIVE state UE case). For RRC_INAC-TIVE state UE, the RAN keeps the UE context by default.

g. The UE (100) decodes paging for S-TMSI at PF/PO timing computed after applying offset to 5G-S-TMSI In another embodiment, following approaches are adopted:

a. NAS based solution for both RRC_IDLE and RRC_I-NACTIVE state UE.

b. AS based solution for RRC_INACTIVE state UE and NAS based signaling for RRC_IDLE state UE.

c. AS based solution for both RRC_IDLE and RRC_I-NACTIVE state UE.

In another embodiment, the UE (100) itself determines the updated UE_ID by adding computed offset and provides to the network operator device (200a or 200b). The network operator device (200a or 200b) utilizes this UE provided UE_ID for paging purpose. Other details for this approach are similar to offset solution as described as earlier. In another embodiment, the UE (100) itself determines the updated UE_ID by adding computed offset and provides to the network in at least one of UE assistance information (RRC signaling) or MUSIM assistance information (NAS signaling) along with other information like DRX parameters, expected paging repetition pattern or the availability information of the UE (100). Other details are similar to the offset approach as described earlier.

5G S-TMSI being temporary, can be frequently reassigned and paging collision may not be completely removed e.g. UE receives new assignment for Globally Unique Temporary Identifier (GUTI) or UE_ID. In this scenario, the UE (100) again detects potential paging collision and initiates the collision avoidance approach as described earlier with the newly computed offset value. Another scenario is when UE (100) is mobile and moves to a new cell or area where new paging configuration is received on at least one of the two networks. The proposed method provides approaches to address this case as follows:

1. Page configuration is not changed and page collision is not detected by UE (100). In this case, the UE (100) does not compute update offset/UE_ID/assistance information and remains in RRC_IDLE or RRC_I-NACTIVE state on both the network operator device (200a or 200b).

2. The page configuration is not changed and the page collision is still detected by the UE (100). The page collision can still occur due to other reasons e.g. NAS procedure reassigned the GUTI or UE_ID. In this case, the UE (100) computes the new offset/UE_ID/assis-tance information to resolve the paging collision issue and pursues with solution as explained earlier.

3. The page configuration is changed and page collision is detected by UE, the UE utilizes the page collision avoidance solution i.e. provide updated offset/UE_ID/assistance information to one of the two network operator device (200a or 200b).

4. The page configuration is changed and page collision is NOT detected by the UE (100):

A. The UE (100) does not provide assistance information to the network operator device (200a or 200b) as the UE (100) determines there is no need for page collision avoid-ance.

B. With solution 1, it is possible that the previous UE_ID/offsets may not remain efficient from power perspective i.e. timing becomes non-optimal. This may be because the paging occasions on the two networks are not closely spaced and UE is required to be awake on two separated time durations in the DRX cycles of the two network operator device (200a or 200b). In this case, alternative solution is to compute the new offset/UE_ID/Assistance information to resolve the paging collision issue and pursue with solution as explained earlier.

In another embodiment, proposed approach does not include offset value/UE_ID/assistance information and the UE (100) just indicates the paging collision possibility to the network operator device (200a or 200b) and the network operator device (200a or 200b) by itself determines the new suitable GUTI/UE_ID for the UE (100) and reassign the same. Further, paging messages to the RAN are sent by the network operator device (200a or 200b) utilizing the new UE_ID. RAN transmits and the UE (100) receives the paging to the UE (100) at PF/PO as determined by new UE_ID. While assigning the new UE_ID, network may not only consider to address to resolve paging collision issue but also network load situations, availability of UE_IDs, uni-form allocation factor for UE_IDs among the UEs and so on.

In another embodiment, assistance information is con-veyed as "UE Assistance Information" in AS signaling which includes at least one of:

A. Preferred DRX cycle, PF_offset parameters are indi-cated for one of the network operator device (200a or 200b) when paging collision risk is detected.

B. UE availability pattern as a bitmap represented in terms of DRX cycles where the UE (100) is available for paging reception. On paging collision detection, each of the USIMs forms mutually exclusive pattern (bit-map) and provide to respective network. Each bit when set to 1 indicates availability of the UE (100) for specified DRX cycle of the pertinent network. The network operator device (200*a* or 200*b*) can schedule paging (or repetition) accordingly.

In another embodiment, the network operator device (200*a* or 200*b*) repeats the paging by following steps:

1. Repetition is based on MUSIM capability indication: There may not be overlapping POs for MUSIM UEs, therefore, repeating blindly increase network burden. That is, UEs which indicated MUSIM capability will only be provided repetition of paging. The UE (100) can indicate MUSIM capability in the UE capability information message or the UE assistance information message.

2. Repetition is for MUSIMS UEs indicating (potential) page collision indication: The Proactively assisting network to consider only specific MUSIM UEs for repetition.

3. Repetition is for MUSIM UEs when no page response/busy indication are received: React to absence of UE paging response. It is not clear to network whether issue is due to the UE (100) un-reachability, decoding error or MUSIM operation and whether to change paging area scope.

In an embodiment, the UE (100) includes assistance information in the NAS signaling message which can include at least one of (potential) paging collision detection indication, an alternative UE_ID to be used by the CN, the proposed offset to the existing PO, paging configuration parameters for the other SIM(s). In an alternative, assistance information is optional and the UE (100) determines by itself to include assistance information or not e.g. when the UE (100) sees it is required to provide a specific offset in order to conserve power and/or to support any other services (e.g. MBS reception in RRC_IDLE/RRC_INACTIVE states) and so on. In an alternative, assistance information is not provided with NAS signaling. In an alternative, assistance information is not provided with NAS signaling and only indication for paging collision detection is provided.

In another embodiment, first time in DRX cycle, gNB can transmit paging in original PF (termed as, primary PF). If response is not received from the UE (100) and paging is retransmitted in next cycle, it can be transmitted in additional PF (termed as, secondary PF). Secondary PF is specified, signaled or configured by the network operator device (200*a* or 200*b*).

In an embodiment, Upon the UE (100) detecting paging collisions between two network operator devices (200*a* and 200*b*), the UE (100) initiates a TAU procedure to the MME of one network, to request an IMSI offset. Further, the UE (100) may provide the IMSI offset to the MME during the TAU procedure. Further, the MME returns an IMSI offset to the UE (100) in the TAU accept. During CN paging delivery, the MME provides to the RAN the UE_ID which is derived based on the IMSI and the IMSI offset. The RAN and the UE (100) use the UE ID as the IMSI to calculate the PF/PO.

In another embodiment, an approach is to finalize and specify a fixed repetition pattern. However, it will take away flexibility with the network. Alternatively, we may consider that repetition pattern is provided by network as a bitmap (say an octet long) to MUSIM UE(s), where each bit represents a Paging cycle unit from original PF/PO occasion (i.e. associated paging cycle) onwards and when set to 1 represents paging transmission (repetition) from network. MUSIM can consider page monitoring and other time critical activities on other network and efficiently select the repetition occasion to receive paging without miss. This information is provided as follows:

A. Broadcast in system information for the MUSIM UEs, to inform the repetition pattern used by network generically B. Specific MUSIM UE is informed, when it indicates (potential) page collision indication to network, providing flexibility for network to cater to the UE (100) by accommodating paging repetition.

In another embodiment, UE specific implementation is proposed. It considers that the UE (100) indicates its choice for page reception to network to facilitate the UE operation better e.g. Indication of UE implementation support may be useful for network operation e.g. paging repetition. The UE indication can possibly include:

A. Page reception approach e.g. round-robin or Support for certain standardized approaches.

B. Expected repetition from network.

This can be possibly provided by the UE (100) in the UE assistance Information message to the network operator device (200*a* or 200*b*).

In one of the embodiment, AS signaling for the UE assistance information is provided to the gNB using one of RRC signaling (e.g. UE assistance information, RRC configuration request, RRC Resume Request, RRC Connection Request, RRC Setup Complete and so on) or MAC signaling (i.e. MAC CE) or RACH (Random Access Channel) Message like Msg3 or Msg B or possibly Msg5. It conveys the offset or alternative UE_ID or DRX configuration for the other network or UE's expected paging repetition or UE scheduling information like what all DRX it will be available and monitor for paging among two SIMs, repetition expectation, approach or strategy UE (100) uses for paging monitoring e.g. round robin, alternate DRX cycle etc. gNB on receiving these information elements, forwards the ones which are relevant for CN e.g. alternative UE_ID or offset information. Further, the gNB may also provide these information elements to the target gNB(s) e.g. during mobility scenarios like handover. Alternatively, if the UE (100) is in the RRC_IDLE state, the gNB transfer all the assistance information to the core network. If the UE (100) is in RRC_INACTIVE state, the gNB chooses to transfer a few or none or all of the information element to the core network. Additionally, or alternatively, the gNB chooses to store a few or none or all of the information element with itself. In another approach, one or more of these information elements are provided to the core network by the UE (100) using NAS signaling.

In another embodiment, the paging collision avoidance approaches as specified in other embodiments of the invention is equally applied to the case of RAN paging and CN paging. That is, the UE (100) in the RRC_IDLE and RRC_INACTIVE states applies the paging collision avoidance approaches as specified.

FIG. 3 shows various hardware components of the UE (100), according to an embodiment as disclosed herein.

In an embodiment, the UE (100) includes a processor (110), a communicator (120), a memory (130), a paging collision controller (140), and the plurality of SIMs (150). The processor (110) is coupled with the communicator (120), the memory (130), the paging collision controller (140) and the plurality of SIMs (150).

The paging collision controller (140) is configured to detect the paging collision between the first SIM (150*a*) and the second SIM (150*b*) a priori. In an embodiment, the paging collision controller (140) is configured to determine the PO and the PF for the first SIM (150*a*) and determine the PO and the PF for the second SIM (150*b*). Further, the paging collision controller (140) is configured to determine whether the PO and the PF for the first SIM (150a) overlaps (partially overlaps or fully overlaps) with the PO and the PF for the second SIM (150b) based on the plurality of parameters. After determining the PO and the PF for the first SIM (150a) overlaps (partially overlaps or fully overlaps) with the PO and the PF for the second SIM (150b), the paging collision controller (140) is configured to detect the paging collision between the first SIM (150a) and the second SIM (150b).

Further, the paging collision controller (140) is configured to determine the offset to avoid the paging collision between the first SIM (150a) and the second SIM (150b). Further, the paging collision controller (140) is configured to select the first network operator device (200a) associated with the first SIM (150a) or the second network operator device (200b) associated with the second SIM (150b) to send the offset. The first network operator device (200a) and the second network operator device (200b) is selected based on the DRX cycle length for the first SIM (150a) and the second SIM (150b), and the RAT utilized on the first SIM (150a) and the second SIM (150b) or the random selection or round-robin selection approach or based on some event like reselection happened on the SIMs (150a and 150b).

The paging collision controller (140) is configured to send the offset to one of the first network operator device (200a) and the second network operator device (200b) to change the paging configuration by the offset in order to avoid the paging collision between the first SIM (150a) and the second SIM (150b). The paging collision controller (140) utilizes one of NAS signaling message or AS signaling message to send the offset.

The paging collision controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 4 shows various hardware components of the network operator device (200a or 200b), according to an embodiment as disclosed herein.

In an embodiment, the network operator device (200a or 200b) includes a processor (210), a communicator (220), a memory (230), and a paging collision controller (240). The processor (210) is coupled with the communicator (220), the memory (230), and the paging collision controller (240).

The paging collision controller (240) is configured to receive the offset from the UE (100) to avoid the paging collision between the first SIM (150a) and the second SIM (150b). The offset is received from the UE (100) using one of the NAS message and the AS message. After receiving the offset from the UE (100) to avoid the paging collision between the first SIM (150a) and the second SIM (150b), the paging collision controller (240) is configured to change the paging configuration by the offset received from the UE (100) in order to avoid the paging collision between the first SIM (150a) and the second SIM (150b). Further, the paging collision controller (240) is configured to send the changed paging configuration (i.e. updated UE_ID or offset) to the gNB and/or UE (100).

The paging collision controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 4 shows various hardware components of the network operator device (200a or 200b) but it is to be understood that other embodiments are not limited thereon. In other embodiments, the network operator device (200a or 200b) may include less or more number of components. Further, the labels or names of the components are used only for illustrative purpose and does not limit the scope of the invention. One or more components can be combined together to perform same or substantially similar function in the network operator device (200a or 200b).

FIG. 5 is a flow chart (S500) illustrating a method, implemented by the UE (100), for avoiding the paging collision in the wireless network (1000), according to an embodiment as disclosed herein.

The operations (S502-S514) are performed by the paging collision controller (140).

At S502, the method includes determining the PO and the PF for the first SIM (150a). At S504, the method includes determining the PO and the PF for the second SIM (150*b*-150*n*). At S506, the method includes determining whether the PO and the PF for the first SIM (150*a*) overlaps (partially overlaps or fully overlaps) with the PO and the PF for the second SIM (150*b*-150*n*) based on a plurality of parameters. At S508, the method includes detecting the paging collision between the first SIM (150*a*) and the second SIM (150*b*-150*n*) in response to determining the PO and the PF for the first SIM (150*a*) overlaps (partially overlaps or fully overlaps) with the PO and the PF for the second SIM (150*b*-150*n*). At S510, the method includes determining the offset to avoid the paging collision between the first SIM (150*a*) and the second SIM (150*b*-150*n*).

At S512, the method includes selecting one of the first network operator device (200*a*) associated with the first SIM (150*a*), and the second network operator device (200*b*) associated with the second SIM (150*b*-150*n*) to send the offset. At S514, the method includes sending the offset to one of the first network operator device (200*a*) and the second network operator device (200*b*) to change the paging configuration by the offset in order to avoid the paging collision between the first SIM (150*a*) and the second SIM (150*b*-150*n*).

FIG. 6 is a flow chart (S600) illustrating a method, implemented by the network operator device (200), for avoiding the paging collision in the wireless network (1000), according to an embodiment as disclosed herein.

The operations (S602-S606) are performed by the paging collision controller (240).

At S602, the method includes receiving the offset from the UE (100) to avoid a paging collision between the first SIM (150*a*) of the plurality of SIMs (150) and the second SIM (150*b*-150*n*) of the plurality of SIMs (150). At S604, the method includes changing the paging configuration by the offset received from the UE (100) in order to avoid the paging collision between the first SIM (150*a*) and the second SIM (150*b*-150*n*) of the UE (100). At S606, the method includes sending the changed paging configuration (i.e. updated UE_ID or offset) to the gNB and/or UE (100).

FIG. 7 is a sequence flow diagram illustrating step by step operations for avoiding the paging collision in the wireless network (1000), according to an embodiment as disclosed herein.

Referring to FIG. 7, at S702, the second network operator device (200*b*) sends the paging to the UE (100). At S704, the first network operator device (200*a*) sends the paging to the UE (100). The UE (100) detects the paging collision and the UE (100) selects the first network operator device (200*a*) and computes the offset to the PO required on second network operator device (200*b*) to prevent collision and loss of paging to first network operator device (200*a*). At S706, the UE (100) sends the NAS signalling including the offset and the paging collision to the second network operator device (200*b*). At S708, the second network operator device (200*b*) sends the GUTI reassignment including the New UE_ID to the UE (100). Based on the GUTI reassignment, the UE (100) determines the new PO/PF and receives the paging from the first network operator device (200*a*). At S710, the first network operator device (200*a*) sends the paging to the UE (100). At S712, the second network operator device (200*b*) sends the paging to the UE (100). At S714, the first network operator device (200*a*) sends the paging to the UE (100). At S716, the second network operator device (200*b*) sends the paging to the UE (100). Paging from both first network operator device (200*a*) and second network operator device (200*b*) are received by the UE (100) without collision.

The proposed method can also be applied to the MME and the eNodeB, IMSI as UE identity as in 4G/EPS.

The various actions, acts, blocks, steps, or the like in the flow charts (S500 and S600) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a user equipment (UE) comprising one or more subscriber identity modules (SIMs) in a wireless network, the method comprising:

detecting a paging collision between a first SIM of the one or more SIMs and a second SIM of the one or more SIMs, wherein the UE is in a radio resource control (RRC) idle state or an RRC inactive state with the first SIM and the UE is in an RRC idle state or an RRC inactive state with the second SIM;

selecting one of a first network entity associated with the first SIM or a second network entity associated with the second SIM;

transmitting, to the one of the first network entity or the second network entity, based on the selection, a registration request message;

receiving, from the one of the first network entity or the second network entity, a registration accept message including a reassigned globally unique temporary identifier (GUTI); and receiving, from the one of the first network entity or the second network entity, a paging message in a paging occasion (PO) determined based on the reassigned GUTI.

2. The method of claim 1, wherein detecting the paging collision between the first SIM and the second SIM comprises:

determining a PO for the first SIM;

determining a PO for the second SIM;

determining whether the PO for the first SIM partially overlaps or fully overlaps with the PO for the second SIM; and detecting the paging collision between the first SIM and the second SIM in response to determining the PO for the first SIM partially overlaps or fully overlaps with the PO for the second SIM.

3. The method of claim 2, wherein determining overlapping between the PO for the first SIM and the PO for the second SIM is performed based on one or more parameters, and wherein the one or more parameters comprise at least one of a UE identity, a PO, a paging frame (PF), a location of a physical downlink shared channel (PDSCH) carrying paging information on the first SIM and the second SIM, a cross-slot configuration, a discontinuous reception (DRX) cycle length, a number of paging frames in a DRX cycle, a number of POs in a PF, a radio access technology (RAT), or a DRX offset parameter of the one or more SIMs.

4. The method of claim 1, wherein the one of the first network entity or the second network entity is selected based on at least one of a discontinuous reception (DRX) cycle length for the first SIM and the second SIM, or a radio access technology (RAT) utilized on the first SIM and the second SIM.

5. The method of claim 1, wherein the registration request message is transmitted to the one of the first network entity or the second network entity via one of a non-access stratum (NAS) message or an access stratum (AS) message.

6. A method performed by a network entity, the method comprising:
    receiving, from a user equipment (UE) including one or more subscriber identity modules (SIMs), a registration request message to avoid a paging collision between a first SIM and a second SIM;
    reassigning a globally unique temporary identifier (GUTI) based on the registration request message;
    transmitting, to the UE, a registration accept message including the reassigned GUTI; and
    transmitting, to the UE, a paging message in a paging occasion (PO) determined based on the reassigned GUTI.

7. The method of claim 6, wherein the registration request message is received from the UE via one of a non-access stratum (NAS) message or an access stratum (AS) message.

8. A user equipment (UE) in a wireless network, the UE comprising:
    a memory including one or more subscriber identity modules (SIMs);
    a transceiver; and
    a controller configured to:
        detect a paging collision between a first SIM of the one or more SIMs and a second SIM of the one or more SIMs, wherein the UE is in a radio resource control (RRC) idle state or an RRC inactive state with the first SIM and the UE is in an RRC idle state or an RRC inactive state with the second SIM,
        select one of a first network entity associated with the first SIM or a second network entity associated with the second SIM,
        transmit, via the transceiver, to the one of the first network entity or the second network entity, based on the selection, a registration request message,
        receive, from the one of the first network entity or the second network entity, a registration accept message including a reassigned globally unique temporary identifier (GUTI), and
        receive, from the one of the first network entity or the second network entity, a paging message in a paging occasion (PO) determined based on the reassigned GUTI.

9. The UE of claim 8, wherein the controller is further configured to:
    determine a PO for the first SIM,
    determine a PO for the second SIM,
    determine whether the PO for the first SIM partially overlaps or fully overlaps with the PO for the second SIM, and
    detect the paging collision between the first SIM and the second SIM in response to determining the PO for the first SIM partially overlaps or fully overlaps with the PO for the second SIM.

10. The UE of claim 9, wherein determining overlapping between the PO for the first SIM and the PO for the second SIM is performed based on one or more parameters, and
    wherein the one or more parameters comprise at least one of a UE identity, a PO, a paging frame (PF), a location of a physical downlink shared channel (PDSCH) carrying paging information on the first SIM and the second SIM, a cross-slot configuration, a discontinuous reception (DRX) cycle length, a number of paging frames in a DRX cycle, a number of POs in a PF, a radio access technology (RAT), or a DRX offset parameter of the one or more SIMs.

11. The UE of claim 8, wherein the one of the first network entity or the second network entity is selected based on at least one of a discontinuous reception (DRX) cycle length for the first SIM and the second SIM, or a radio access technology (RAT) utilized on the first SIM and the second SIM.

12. The UE of claim 8, wherein the registration request message is transmitted to the one of the first network entity or the second network entity via one of a non-access stratum (NAS) message or an access stratum (AS) message.

13. A network entity in a wireless network, the network entity comprising:
    a transceiver; and
    a controller configured to:
        receive, via the transceiver, from a user equipment (UE) including one or more subscriber identity modules (SIMs), a registration request message to avoid a paging collision between a first SIM and a second SIM,
        reassign a globally unique temporary identifier (GUTI) based on the registration request message, and
        transmit, via the transceiver, to the UE, a registration accept message including the reassigned GUTI, and
        transmit, to the UE, a paging message in a paging occasion (PO) determined based on the reassigned GUTI.

14. The network entity of claim 13, wherein the registration request message is received from the UE via one of a non-access stratum (NAS) message or an access stratum (AS) message.

* * * * *